(12) United States Patent
Razzell et al.

(10) Patent No.: US 7,874,793 B2
(45) Date of Patent: Jan. 25, 2011

(54) BLADE CLEARANCE ARRANGEMENT

(75) Inventors: Anthony G Razzell, Derby (GB); John R Webster, Derby (GB); Geraint W Jewell, Sheffield (GB)

(73) Assignee: Rolls-Royce plc, London (GB)

(*) Notice: Subject to any disclaimer, the term of this patent is extended or adjusted under 35 U.S.C. 154(b) by 832 days.

(21) Appl. No.: 11/890,520

(22) Filed: Aug. 7, 2007

(65) Prior Publication Data
US 2009/0297330 A1    Dec. 3, 2009

(30) Foreign Application Priority Data
Aug. 9, 2006    (GB) ................................. 0615782.0

(51) Int. Cl.
*F01D 11/20*    (2006.01)
(52) U.S. Cl. ..................... 415/173.1; 415/126
(58) Field of Classification Search ............... 415/1, 415/126, 173.1, 221; 277/409, 410, 411
See application file for complete search history.

(56) References Cited

U.S. PATENT DOCUMENTS

| | | | |
|---|---|---|---|
| 4,434,987 A * | 3/1984 | Albers et al. | ............... 277/317 |
| 4,447,063 A * | 5/1984 | Kotzur et al. | ............... 277/304 |
| 6,142,477 A | 11/2000 | Meinzer | |
| 6,746,019 B1 * | 6/2004 | Liebenberg et al. | ......... 277/410 |

FOREIGN PATENT DOCUMENTS

| | | |
|---|---|---|
| EP | 0 578 285 A | 1/1994 |
| GB | 2 363 864 A | 1/2002 |
| WO | WO 01/09488 A | 2/2001 |

* cited by examiner

*Primary Examiner*—Ninh H Nguyen
(74) *Attorney, Agent, or Firm*—Jeffrey S. Melcher; Manelli Denison & Selter PLLC

(57) ABSTRACT

Control of blade clearance gaps between rotating turbine blades and an associated casing in a gas turbine engine is important in order to maintain operational efficiency. It is desirable to achieve accurate gap control but previous passive and scheduled thermal gap adjustment systems have been relatively course. By provision of a winding through which a specific electrical current is passed in order to create electromagnetic force for displacement of an armature associated with a seal forming part of the casing it is possible to adjust the gap between that seal and a tip part of a rotating blade assembly. Normally a blade gap monitoring technique is used in association with specific operational requirements with respect to the gap by the control in order to determine the electrical current presented to the winding. As a fail-safe measure a permanent magnet or bias or some other form can be provided to ensure displacement to a fail-safe position with an adequate blade gap clearance for continued operation should there be power failure or an excess electrical current presented to the winding.

23 Claims, 4 Drawing Sheets

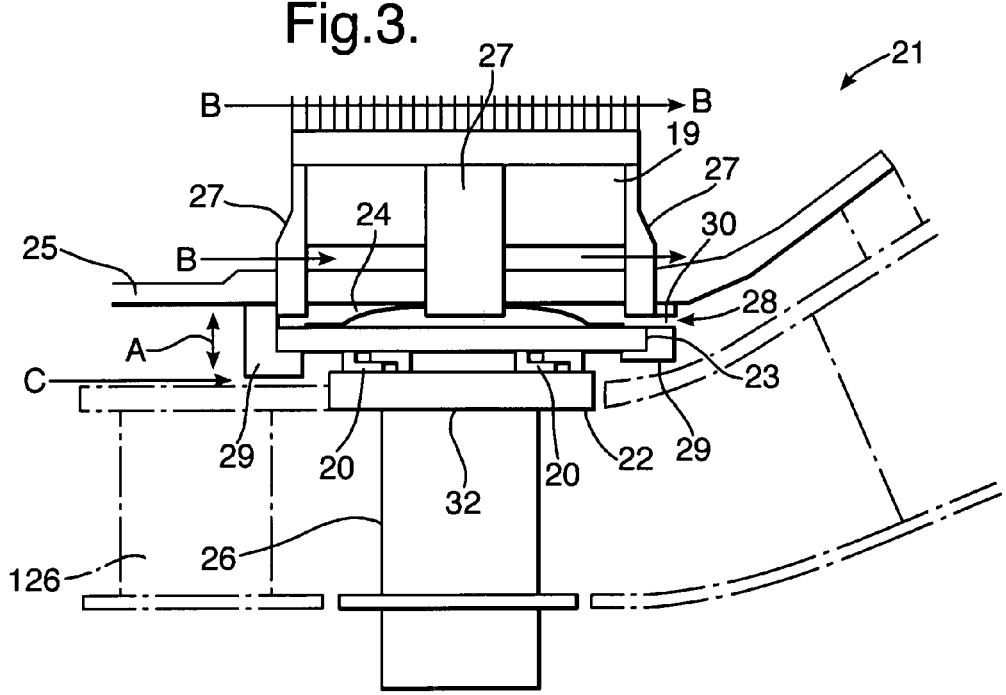
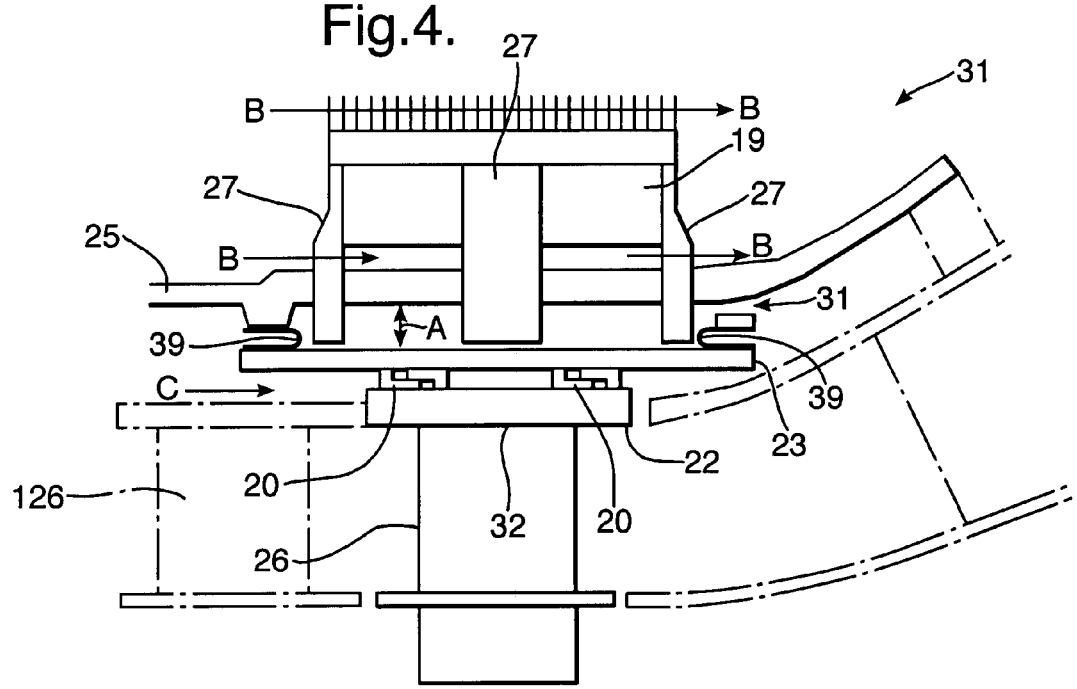

BLADE CLEARANCE ARRANGEMENT

CROSS-REFERENCE TO RELATED APPLICATIONS

This application claims priority to GB 0615782.0, filed 9 Aug. 2006.

BACKGROUND OF THE INVENTION

The present invention relates to blade clearance arrangements and more particularly to blade clearance arrangements used with regard to shrouded or shroudless turbines within a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

In view of the above, it will be appreciated that the control of the gap between the tips of blades and an outer casing is important in order to achieve efficiency with respect to the turbine operation as well as to avoid problems such as tip oxidation reducing blade life particularly when utilised with the shroudless turbines. Furthermore, with higher loading upon turbines it will be appreciated that accurate control of tip clearance becomes more important. Nevertheless, there is a continuing requirement to achieve leaner combustors and a reduced blade count so that the use of shroudless turbines is at least more convenient. It will be understood that inherently due to variable rotational speeds, loading and temperature cycling, blade tip clearance gaps will vary through operational cycling of a gas turbine engine. Techniques have been developed for monitoring the gap width between blade tips and an outer casing but convenient means for adjusting the gap are less readily available. Thus, the feedback control mechanism which monitors the gap width can be specified in order to achieve accurate tip clearance control and so enable high efficiency and performance retention in an engine but there are limitations with respect to the accuracy with which the clearance gap can be adjusted or maintained.

Previous approaches to tip clearance control have either depended upon scheduled thermal processing or pneumatic systems. For example, a scheduled thermal tip clearance gap control uses a passive inner ring and controlled thermal expansion of a carrier ring to move nozzle guide vanes and attach seal elements radially in and out relative to a blade. Another example is of a thermally driven single skin casing which is locally cooled with bypass air to change the radial position of the seal elements attached to it and so adjust clearance gaps between that casing and blade tips. In a pneumatic arrangement, air pressure behind seal segments is rapidly reduced to drive the segment out prior to a desired operational requirement for the engine, such as a particular aircraft manoeuvre, and then the segments are recovered to their original position after a time. In such circumstances these approaches are scheduled, that is to say they respond to a manual control signal or adapt thermally due to a desired operational requirement such as throttle setting. Normally tip clearances in the order of 0.020" to 0.035" are achieved, but this can vary over the course of engine life and flight cycling.

The above thermal and pneumatic arrangements are typically too crude for acceptability with regard to shroudless turbine blade arrangements. Potentially clearance gap widths of less than 0.01" would be desirable in order to achieve turbine efficiency and an acceptable blade life in a gas turbine engine. Furthermore, in order to achieve higher efficiencies, it would be desirable to control tip gap clearance throughout all engine operational cycles and, it will be understood that for feedback control, previous arrangements have difficulties with regard to compensation for expected or predictable changes in blade or segment condition, particularly under transient conditions.

SUMMARY OF THE INVENTION

In accordance with aspects of the present invention there is provided a blade clearance arrangement for a gas turbine engine, the arrangement comprising a seal associated with an armature with an electro-magnetic winding arrangement to specifically move the armature dependent upon electrical current passing through the winding and so the position of the seal, the winding being arranged to one side of a casing incorporating the seal and magnetically coupled to the armature by a magnetic bridge member extending through the casing.

Typically, the armature has a bias to one position. Typically, the bias is provided by a mechanical spring. Generally, the bias is towards a fail-safe position for the seal. Potentially, the armature is associated with the casing through a membrane. Potentially, the membrane provides bias for the armature. Additionally, the arrangement may include a permanent magnet. Potentially, the permanent magnet provides bias for the armature. Additionally, the permanent magnet facilitates linearization of a force displacement relationship between the electric current passing through the winding and the displacement movement length.

Potentially, the armature is retained by radial stop elements to control radial displacement and limit axial displacement. Potentially, the radial stop elements define a chamber and the armature provides a piston moved within that chamber.

Typically, the armature is secured to the seal by overlapping latch associations.

Advantageously, the winding is cooled in use by a cooling air flow upon a winding side of the casing. Possibly, the net radial force requirement for the actuator is minimised by pressure balancing across the armature/seal segment assembly.

Possibly, the winding and the bridge members are arranged to provide opposite movement of the armature dependent upon electrical current value. Typically, there is inward movement below a specific electrical current passing through the winding and movement outward above the specific electrical current passing through the winding.

Possibly, the arrangement includes a rotating blade assembly in use and a control, the blade assembly configured adjacent to the seal with a gap between them and the control arranged to provide electrical current to the winding dependent upon a desired width for the gap.

Typically, the control provides electrical current dependent upon a desired variation in the gap. Advantageously, the control varies the gap dependent upon operational demand signals.

Possibly, the control varies the gap dependent upon sensor signals indicative of current gap value and provides electrical current to the winding to achieve a desired gap value.

Also in accordance with the present invention there is provided an assembly including a plurality of arrangements as described above.

Additionally, in accordance with the present invention there is provided a gas turbine engine incorporating an arrangement as described above.

Further in accordance with the present invention there is provided a method of blade clearance control using a blade clearance arrangement as described above.

BRIEF DESCRIPTION OF THE DRAWINGS

Embodiments of aspects of the present invention will now be described by way of example only with reference to the accompanying drawings, in which

FIG. 3 is a schematic illustration of a first embodiment of a blade clearance arrangement in accordance with aspects of the present invention;

FIG. 4 is a schematic cross-section of a second embodiment of a blade clearance arrangement in accordance with aspects of the present invention;

DETAILED DESCRIPTION OF THE INVENTION

Control of clearance gaps between blades and outer casings within a gas turbine engine as outlined above provides improvements with respect to turbine efficiency and blade life. A number of techniques have been developed and are described elsewhere with regard to determining the gap between a blade tip and a casing and signals provided from such monitoring and sensing techniques will be utilised generally in accordance with aspects of the present invention in order to adjust and vary the clearance gap between the blade and the casing. Aspects of the present invention utilise an electro-magnetic reluctance in order to displace a seal generally in the form of a segment about the casing of the engine incorporating the blade. In such circumstances, by antagonistic effects between electro-magnetic displacement and movement and typically a bias, accurate control and movement of the seal can be achieved and therefore more closely defined gap widths determined.

Aspects of the present invention use electro-magnetic reluctance to move an armature which is connected to one or more seal segments. The seal segments are therefore moved radially in or out depending on the electrical current in the winding which is driving the armature. To obtain a controlled movement a tip clearance sensor is used to measure the tip gap. The electrical signal from the sensor is fed into a control which drives the winding by applying an appropriate electrical current until the desired tip clearance is reached. An electrical current which maintains the tip gap is then maintained by the control. In this way, the tip gap can be controlled accurately.

Figure 1:
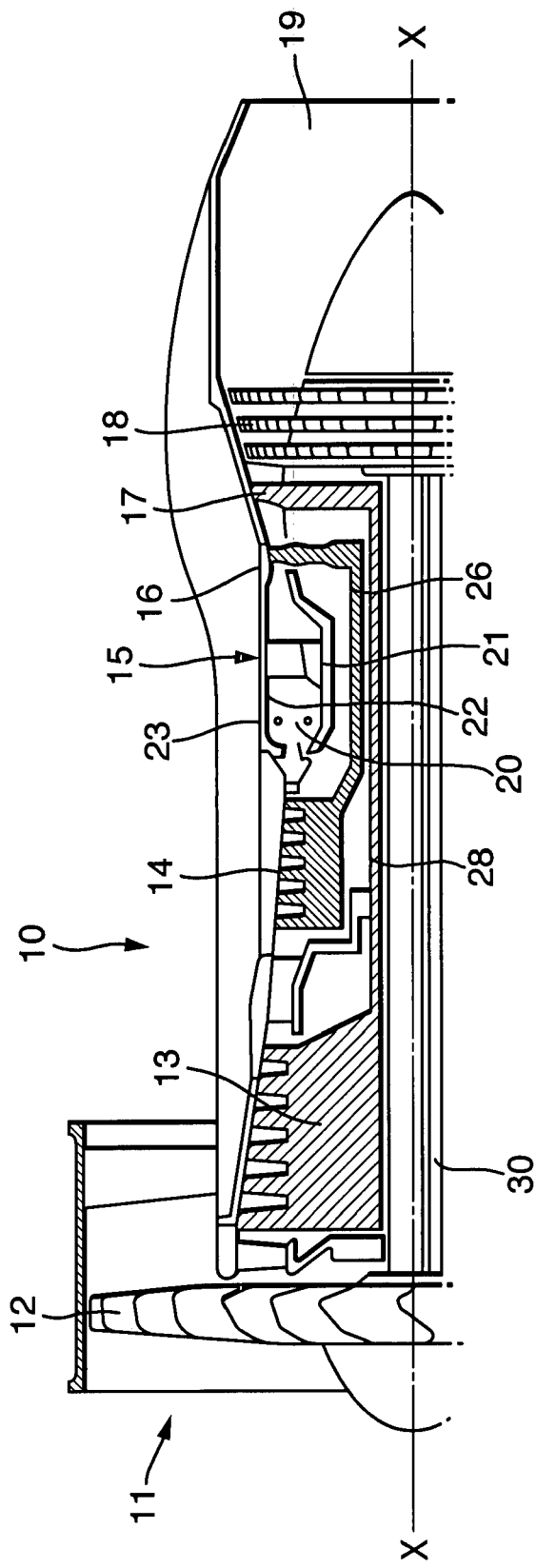
FIG. 1 is a sectional side view of a gas turbine engine.
Figure 2:
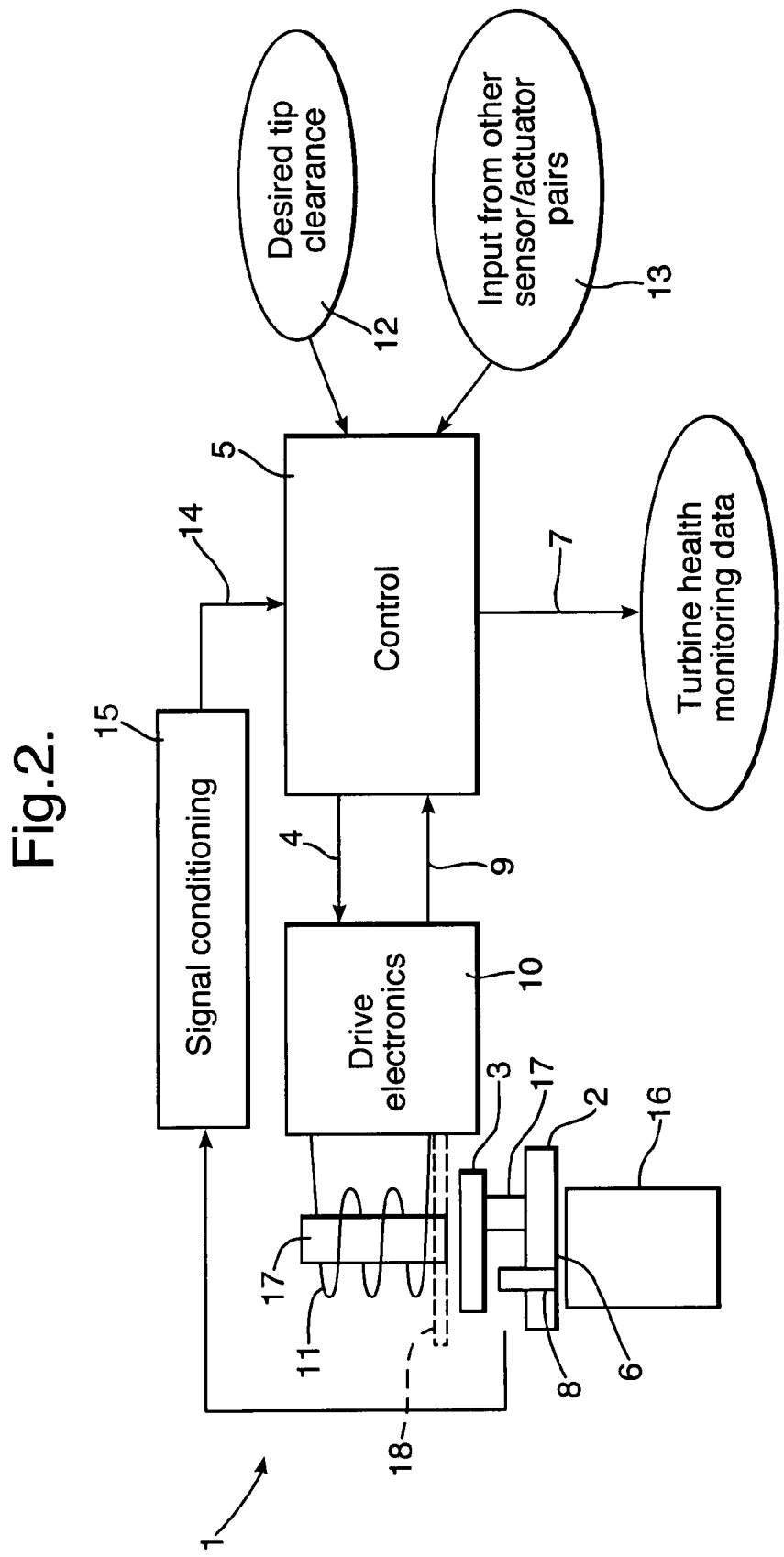
FIG. 2 is a schematic block diagram illustrating a blade clearance arrangement in accordance with aspects of the present invention.

FIG. 2 provides a block diagram illustrating a blade clearance arrangement 1 in accordance with aspects of the invention. A seal 2 segment faces the blades and is attached to an armature 3. However, it may be that multiple segments are assembled into a cassette which is attached to the armature 3. A clearance gap requirement input 4 may be obtained from the engine control 3 to enable scheduled changes in tip clearance 6 to be achieved, for example, the tip clearance 6 may be temporarily increased to prevent damage caused by manoeuvring loads. Other sensor/actuator pairs could also provide information, for example if there is a sensor failure then this may be compensated for by using signals from the two adjacent sensors, accepting some degradation in clearance gap control. An output 7 from the system could be engine health monitoring data. This could include assessment of blade tip erosion caused by oxidation or brief touching or blade vibration information which could be derived from tip timing data from a sensor 8. Feedback 9 from power electronics 10 to the control unit 5 on the state of a magnetic circuit, for example, size of air gap 6 derived from a sensing coil within the winding to measure magnetic flux, or rate of change of electrical current from pulse width modulation could be used to derive positional information of the armatures, or the force that the magnetic circuit is acting against. Multiple sensors/actuators for individual armatures could be used to compensate for out of round errors in the casing/segments assembly as each sensor/actuator pair can locally correct it.

As indicated above, the control 5 will provide electrical signals 4 to drive electronics 10 in order that the winding 11 can cause movement of the armature 3 and therefore the associated seal 2. The control 5 determines the electrical current driven through the drive electronics 10 in accordance with a desired blade tip clearance value 12 and as indicated potentially other input signals from other sensors and sensors/actuator pairs in an assembly of blade clearance arrangements in accordance with the present invention within a gas turbine engine. These input signals 12, 13 are also augmented with signals 14 taken from the sensor 8 and appropriately conditioned in a conditioning stage 15 in order that some determination as to current blade clearance gap 6 can be utilised by the control 5. In such circumstances as indicated above, the control 5 through the winding 11 and, in particular, the electrical current passing through those windings 11 can cause adjustment and movement of the armature 3 and so the associated seal 2 relative to a blade or blades 16 as they rotate such that the gap 6 is varied and adjusted.

In accordance with aspects of the present invention there is separation of the actuator winding 11 from the hot environment inside a turbine casing. This separation is enabled by the use of magnetic flux carrying bridge members 17 which penetrate a casing wall 18 (shown by a broken line). Each winding 11 is thus able to be placed on the outside of the casing 8 typically at a temperature of 250°C. The actuator armature 3 is attracted to, or repelled from, the bridge member 17 with a force dependent on the electrical current in the winding 11 and the distance between the armature 3 and the bridge member 17. Being inside the casing 18, the armature 3 will be at a temperature of 350°C to 800°C. Seal 2 segments attached to the armature 3 are thus moved by changes in the electrical current flowing in the winding 11 on the outside of the casing 18.

FIG. 3 illustrates a first embodiment of a blade clearance arrangement in accordance with aspects of the present invention. Thus, as can be seen, an arrangement 21 has a blade 26 and a seal 22 secured to a moving armature 23 through latch connections 20. An actuator comprising a bridge member 27 and windings 19 act to cause movement of the armature 23 in the direction of arrow-heads A against a bias provided by a spring 24. As can be seen, the winding 19 and other actuator components to cause movement of the armature 23 are located outside of a casing 25 so that coolant air flows in the direction of arrow-head B act to limit the exposure temperature of the winding 19. The bridge members 27 extend across the casing 25 in order to cause further magnetic reaction movements of the armature 23.

It will be understood that typically there will be a number of blades 26 arranged in an assembly rotating about an axis lateral to FIG. 3. Furthermore, there may be a further turbine nozzle guide vane assembly in front of blades 26. In any event, there will also be a casing air flow between the seal 22 and the armature 23 depicted by arrow-head C. In the above circumstances it will be appreciated that the windings 19 are therefore presented in a position which is relatively cool compared to hotter gases adjacent to the blade 26 inside the casing.

To minimise the size and weight of the actuator provided by the windings 19 and bridge members 27 acting as pole pieces across the casing 25, a high saturation flux density material such as a cobalt iron alloy will be used for the bridge members 27. It will also be understood that the casing 25 will generally be formed from non-magnetic materials and therefore will not cause a short-circuiting of the magnetic flux path.

It will be understood that the inwards force on the seal 22 due to pressure differentials across it will be significant, necessitating a balancing force. In FIG. 3 this is achieved by using the armature as a piston, with air inside the segment 23 in balance with casing gas C on the inner side between the armature 23 and seal 22 segment. As the average pressure on the rotor side of the segment is closer to the cooling air pressure, the net radial force on the armature 23/seal 22 assembly is relatively low. The piston arrangement is achieved by provision of radial stop members 29 which effectively define a chamber in which the armature 23 acts as a piston for movement in the direction of arrow-heads A as indicated previously. The winding cooling air 28 typically passes through a gap in the radial stop members 29 to create the pressure differential in order to facilitate movement as described previously.

Rather than forming a piston-type armature 23 action as depicted in FIG. 3, a flexible membrane may be used, as depicted in FIG. 4, which ensures that the movement in the direction of arrow-heads AA is purely elastic and therefore the potential for fretting/jamming and gas leakage issues across the seal are avoided. Similar reference nomenclature has been utilised in FIG. 3 to that utilised in FIG. 2 except where relevant to the use of a flexible membrane 39. Thus, as previously, a winding 19 through an electrical current passing through the winding presents variable magnetic inducement to cause movement of the actuator 23 associated through appropriate couplings 20 to a seal 22 adjacent to a blade 26. Thus, a gap 32 between a tip of the blade 26 and the seal 22 can be varied as required. The passing of electrical current within the coil 19 only results in an attractive force on the armature and therefore the flexible membrane members 39 will provide bias in return in order to provide a capacity for relative movement in the direction of arrow-heads A. In such circumstances, axial or lateral movement of the armature 23 is limited by the flexible membrane 39 but the potential for fretting and jamming by the armature 23 within a containment chamber as defined by radial stops 29 (FIG. 3) is removed.

In FIG. 4 the winding 19 is again located on the cooler side of a casing 25 wall with bridge members 27 extending through that casing 25 in order to provide magnetic interaction with the actuator 23 and therefore cause movement of that actuator 23 along with its associated seal 22. The electrical current passing through the windings 19 will be varied by a control device as described previously with regard to FIG. 2 and therefore allows adjustment of the gap 32 as required by operational circumstances. It will also be understood in advantageous aspects of the present invention a sensor device will be provided in order to determine the gap 32 and therefore to allow the control to adjust the electrical current passing through the winding 19 through a feedback control approach.

As the gap 32 is set by electrical current passing through the winding 19 for each respective actuator/rotating blade combination, it will be understood that consideration must be made with regard to the potential for power failure. It is important that the arrangement has a safe condition which at least avoids contact between turbine blades 26 and the seal 22 as part of its surrounding casing. As indicated above, generally the windings 19 through the electrical current provided by the controller will set the gap 32 for optimised efficient operation. Nevertheless, a higher tip clearance gap may be acceptable, will still maintain operation of the engine although with a degraded turbine performance and increased oxidation at the tip, but without any immediate concern with mechanical failure and therefore acting as a fail-safe condition.

Figure 5:
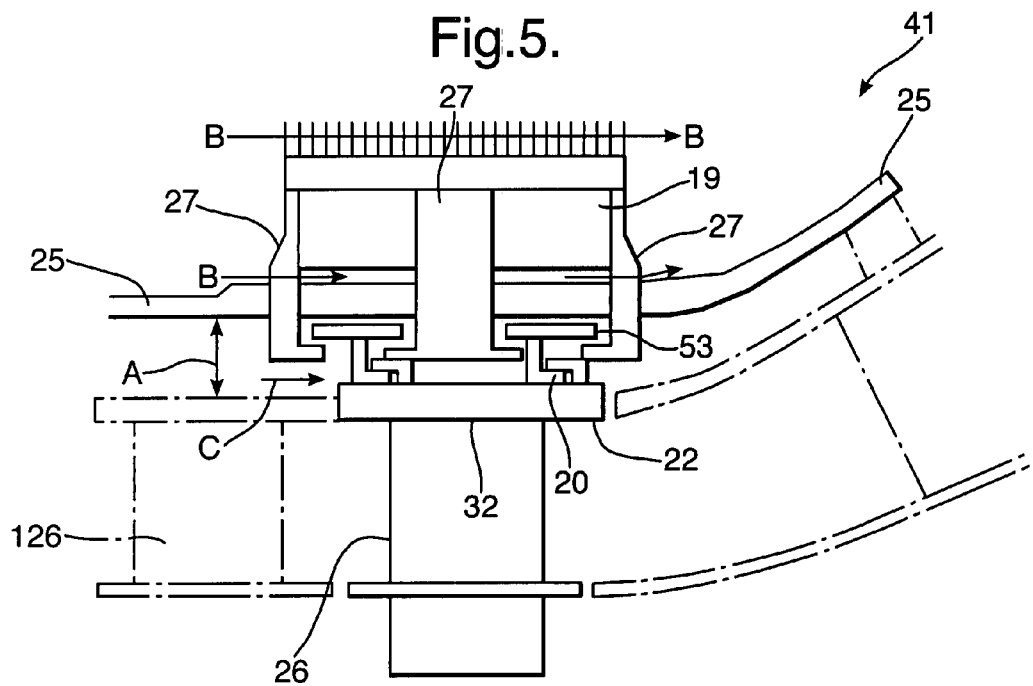
FIG. 5 is a schematic cross-section of a third embodiment of a blade clearance arrangement in accordance with aspects of the present invention; and, FIG. 6 is a schematic cross-section of a fourth embodiment of a blade clearance gap arrangement in accordance with aspects of the present invention.
Figure 6:
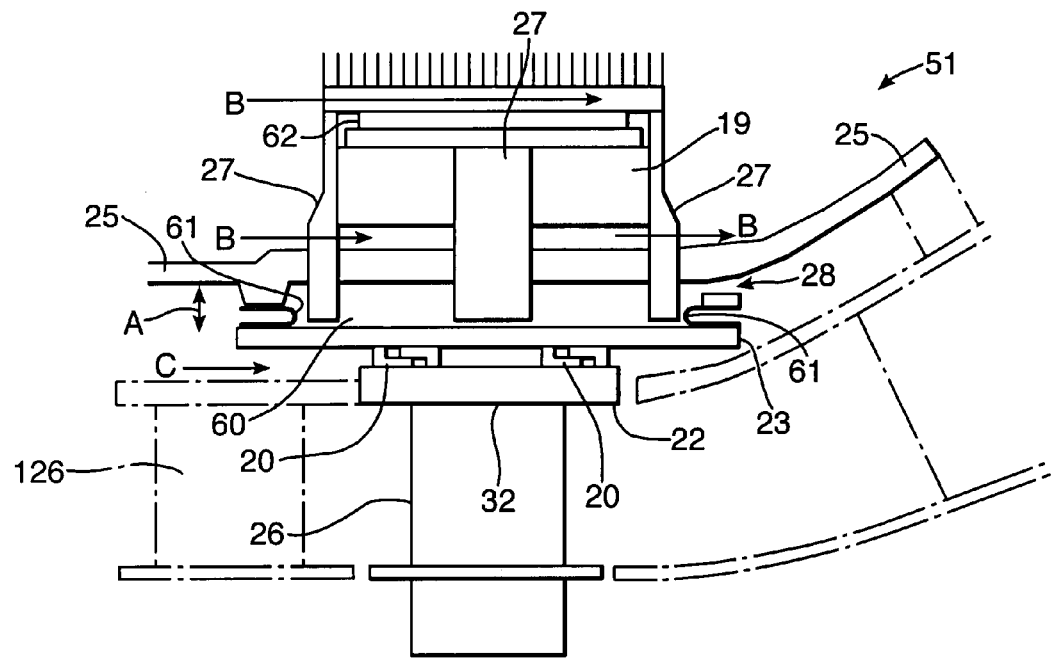

In FIGS. 3 and 4 as indicated, a bias is provided by a mechanical spring 24 or through the flexible membrane 39. Generally, the bias provided by the spring 24 or flexible membrane 39 will be towards closing the gap 32 between the seal 22 and tip of the blade 26. In such circumstances, the effect of the magnetic interaction between the bridge members 27 and the armatures 23 will be to draw the armature outwardly away from the blades 26 such that if there is an electrical power failure the bias of the spring 24 or membrane 39 may result in contact between the seal 22 and the tip of the blade 26 causing contact. In that situation, the spring 24 and membrane 39 would not act to return the arrangement to a fail-safe position. However, if the windings 19 were arranged to push the actuator 23 inwardly in normal operation to effectively close the gap 32, then it will be understood a power failure would result in the bias created by the springs 24 or membrane 39 to pull the seal 22 away from the blade 26 and therefore open the gap 32 to then return the arrangement into a fail-safe position. Further alternative embodiments for achieving a fail-safe position are depicted in FIGS. 5 and 6. These figures again utilise the same reference nomenclature for comparison other than where necessary to distinguish these embodiments from the previous first and second embodiments depicted respectively in FIGS. 3 and 4.

In FIG. 5, a third embodiment is depicted in which the direction of the magnetic force created by the winding 19 is reversible such that an increase in electrical current in the winding causes the seal to move radially inwards rather than outwards or vice versa, dependent upon the desired operational configuration of the arrangement. This reversal in the magnetic force is achieved by appropriate design of the bridge members 27. As can be seen, an armature 53 associated through hooks 20 with a seal 22 is located at a position so that the bridge members 27 can create, as indicated above, radial inwards magnetic force as required. This magnetic force will typically be balanced by net radial inward forces caused by a pressure drop across the segment as described previously between air flows 28 and air flow C and the magnetic force created by the windings in the actuator assembly. As previously, this opposing force may be created through a piston effect or through a membrane in order to create the opposing bias force to balance the net radial inward force caused by the pressure drop and magnetic actuator effect.

An alternative fourth embodiment incorporates a permanent magnet to provide the outwards force which is counteracted in normal operation by the winding through an opposing magnetic field created with an electric current passing through the winding. FIG. 6 provides a schematic cross-section of this fourth embodiment. Similar reference nomenclature has been used to previous FIGS. 2 to 5 for correspondence with amendment only in relation to those differences in FIG. 6 in comparison with these previous embodiments. Thus, as previously, the winding 19 in the arrangement 51 creates an electro-magnetic force presented through bridge elements 27 such that through interaction with an armature 23 itself associated with a seal 22 movement in the direction of arrow-heads A is achieved. There is again a pressure differential in a volume 60 between a casing pressure in an air flow indicated by arrow-head C and a winding pressure provided by an air flow in the volume 60 with a gap to allow air to pass in and out of the volume 60. Elastic membranes 61 are provided in order to create bias in relation to the movements in the direction of arrow-heads A but in accordance with the embodiment depicted in FIG. 6, bias is particularly provided as a fail-safe provision through a permanent magnet 62.

The permanent magnet 62 provides an outwards force, which is counteracted by the winding when energised with an electrical current. In the case of failure of the winding or control system, the permanent magnet 62 will pull the seal 22 outwards, preventing unwanted contact with the blade 26. The use of the permanent magnet 62 is made possible by its location outside the casing 25. An additional advantage of this embodiment is that the permanent magnet 62 has the effect of partially linearising the force-displacement curve, easing the control regime regularised with respect to application of electrical current to the winding 19 for movement.

In the above circumstances, as indicated, a fail-safe position is provided through a mechanical bias, a permanent magnet bias or through provision of reversal of the electro-magnetic force created to cause displacement of the actuator in the event of power failure or an over-electrical current. In such circumstances, although not optimised for turbine operation, it will be appreciated that the possibility of a blade contacting the casing/seal segment is reduced.

The present blade clearance arrangement as indicated principally operates between the blade tip and an outer casing formed with a seal segment. By the present arrangement there is improved control of blade tip clearance over conventional passive and scheduled thermal blade clearance control arrangements which can be cumbersome and unable to provide the necessary accuracy with regard to rotating blade tip clearance for enhanced efficiency. It will also be understood that as each blade to seal or seal group is individually addressable through electrical current provided to its specific winding, the present arrangement can compensate for out of round problems with respect to the casing and seal segment or seal group in a whole assembly, that is to say, each seal segment or group of segments can be displaced by differing amounts at different radial positions in order to compensate for the casing not being perfectly round.

By provision outside of the casing of the windings for actuation in respect of movement of the seal segments, it will be understood that each winding is in a cool position and therefore will provide more acceptable performance. Magnetic flux is transmitted through the casing via bridge members in the form of magnetically soft pole pieces such as cobalt-iron alloys whilst the casing material is generally non-metallic. In such circumstances, by the present blade clearance arrangement, the winding is kept in a relatively benign cooler environment and it is cooled by bypass air. The bridge members may be friction welded to the casing if appropriate material compatibility can be achieved, thus eliminating the possibility of air and gas leakage through the casing wall, and reducing the defects in the mechanical strength of the casing caused by the presence of holes. One embodiment may be to manufacture the casing via a powder metallurgy route and incorporate the flux carrying section of the casing as a powder of different composition.

By the use of a permanent magnet it is possible to achieve a fail-safe bias to a bias position which maintains a safe clearance gap between the blade tip and the casing despite power loss. It will also be understood that the permanent magnet modifies the inverse law relationship of the electrical current passing through the winding to create displacement and movement of the armature. Thus, there is a greater linearality between force and displacement which can be utilised by the control in terms of the electrical current value presented to the control and in terms of the electrical current value presented to the winding to cause movement of the actuator and therefore the armature and its associated seal segment.

Generally, the inwards force on the seal segment resulting from the pressure drop through the arrangement is significant and is typically in the order of several kNs. Thus, the actuator in terms of the winding and its associated bridge members must be capable of achieving a matching force to maintain clearance gap spacing. The pressure difference can be balanced to some extent by feeding a cavity behind the actuator armature with lower pressure air, balancing the lower pressure air in the annulus, but allowing the higher pressure cooling air to still be fed to the seal segment. In such circumstances the present arrangement has the advantage of reducing the force required by the winding as an actuator and therefore its size and weight requirements.

Typically, the control in accordance with the present invention will be associated with appropriate means for monitoring tip clearance. This tip clearance monitoring and control system may utilise case cooling in order to provide an indication of tip clearance which will be of a relatively slow response nature but nevertheless will give sufficient coarse control using the present electro-magnetic winding actuator to give a fast response for relatively fine control.

An alternative embodiment uses the present invention without any form of tip clearance measurement, the activation of the segments being triggered by throttle position or manoeuvres of the aircraft.

Although described with a single blade to opposed seal segment gap it will be understood that a number of blades will be rotating relative to the segment and it is the rotating tips to segment gaps which is controlled.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A blade clearance arrangement for a gas turbine engine, the arrangement comprising a seal associated with an armature with an electro-magnetic winding arrangement to specifically move the armature dependent upon electrical current passing through the winding and so the position of the seal, the winding being arranged to one side of a casing incorporating the seal and magnetically coupled to the armature by a magnetic bridge member extending through the casing.

2. An arrangement as claimed in claim 1 wherein the armature has a bias to one position.

3. An arrangement as claimed in claim 2 wherein the bias is provided by a mechanical spring.

4. An arrangement as claimed in claim 2 wherein the bias is towards a fail-safe position for the seal.

5. An arrangement as claimed in claim 1 wherein the armature is associated with the casing through a membrane.

6. An arrangement as claimed in claim 5 wherein the membrane provides bias for the armature.

7. An arrangement as claimed in claim 1 wherein the arrangement may include a permanent magnet.

8. An arrangement as claimed in claim 7 wherein the permanent magnet provides bias for the armature.

9. An arrangement as claimed in claim 7 wherein the permanent magnet facilitates linearization of a force displacement relationship between the electric current passing through the winding and the displacement movement length.

10. An arrangement as claimed in claim 1 wherein the armature is retained by radial stop elements to control radial displacement and limit axial displacement.

11. An arrangement as claimed in claim 10 wherein the radial stop elements define a chamber and the armature provides a piston moved within that chamber.

12. An arrangement as claimed in claim 1 wherein the armature is secured to the seal by overlapping hook associations.

13. An arrangement as claimed in claim 1 wherein the winding is cooled in use by a cooling air flow upon a winding side of the casing.

14. An arrangement as claimed in claim 1 wherein the net radial force requirement for the actuator is minimised by pressure balancing across the armature/seal segment assembly.

15. An arrangement as claimed in claim 1 wherein the winding and the bridge members are arranged to provide opposite movement of the armature dependent upon electrical current value.

16. An arrangement as claimed in claim 15 wherein there is inward movement below a specific electrical current passing through the winding and movement outward above the specific electrical current passing through the winding.

17. An arrangement as claimed in claim 1 wherein the arrangement includes a rotating blade assembly in use and a control, the blade assembly configured adjacent to the seal with a gap between them and the control arranged to provide electrical current to the winding dependent upon a desired width for the gap.

18. An arrangement as claimed in claim 17 wherein the control provides electrical current dependent upon a desired variation in the gap.

19. An arrangement as claimed in claim 18 wherein the control varies the gap dependent upon operational demand signals.

20. An arrangement as claimed in claim 17 wherein the control varies the gap dependent upon sensor signals indicative of current gap value and provides electrical current to the winding to achieve a desired gap value.

21. An assembly including a plurality of arrangements as claimed in claim 1.

22. A gas turbine engine incorporating an arrangement as claimed in claim 1.

23. A method of blade clearance control using a blade clearance arrangement as claimed in claim 1 wherein a desired blade clearance gap is determined and an electrical current is provided to the winding in order to achieve that blade clearance gap.

* * * * *